(12) United States Patent
Lewis (10) Patent No.: US 12,104,736 B2
(45) Date of Patent: Oct. 1, 2024

(54) PIGTAIL HOSE WITH ELBOW FITTING

(71) Applicant: GAS STOP EUROPE BV, Assen (NL)

(72) Inventor: Chris Andrew Lewis, Devon (GB)

(73) Assignee: GAS STOP EUROPE BV, Assen (NL)

( * ) Notice: Subject to any disclaimer, the term of this patent is extended or adjusted under 35 U.S.C. 154(b) by 73 days.

(21) Appl. No.: 17/475,902

(22) Filed: Sep. 15, 2021

(65) Prior Publication Data

US 2023/0077754 A1 Mar. 16, 2023

(51) Int. Cl.
*F16L 43/00* (2006.01)
*F16L 15/00* (2006.01)

(52) U.S. Cl.
CPC .......... *F16L 43/003* (2013.01); *F16L 15/006* (2013.01)

(58) Field of Classification Search
CPC ...... F16L 43/003; F16L 43/001; F16L 15/006
USPC ................................. 285/179, 124.5
See application file for complete search history.

(56) References Cited

U.S. PATENT DOCUMENTS

| | | | | |
|---|---|---|---|---|
| 1,851,031 A * | 3/1932 | Baldwin, Jr. | ........... | B23P 13/02 285/179 |
| 3,179,156 A * | 4/1965 | Weiss | ............ | F24C 3/042 501/153 |
| 3,778,843 A * | 12/1973 | Tullos | ............ | B43K 1/12 285/179 |
| 3,928,711 A * | 12/1975 | Jakobsen | ............ | H02G 15/28 174/11 R |
| 5,269,171 A * | 12/1993 | Boyer | ............ | G01M 3/2807 73/40.5 R |
| 5,327,879 A * | 7/1994 | Ferraro | ............ | A47J 37/0786 126/41 R |
| 5,478,121 A * | 12/1995 | Foti | ............ | F16L 27/0861 285/119 |
| 5,787,916 A * | 8/1998 | Shaw | ............ | F16K 37/00 137/557 |
| 5,971,744 A * | 10/1999 | Eaton | ............ | F23G 7/08 431/355 |
| 5,992,438 A * | 11/1999 | Shaw | ............ | F17C 13/04 137/557 |
| 6,032,616 A * | 3/2000 | Jones | ............ | A47L 11/4011 122/32 |
| 6,341,803 B1 * | 1/2002 | Allen, III | ............ | F16L 37/23 285/39 |
| 6,438,895 B1 * | 8/2002 | Fortier | ............ | A01G 23/14 285/133.11 |
| 6,655,925 B1 * | 12/2003 | Robenalt | ............ | F04B 49/00 417/63 |
| D872,834 S | 1/2020 | Howard | | |
| 2006/0038399 A1 * | 2/2006 | Tremoulet | ............ | F16L 41/03 285/124.5 |
| 2006/0104836 A1 * | 5/2006 | Phillips | ............ | F04B 41/02 417/410.1 |
| 2008/0110518 A1 * | 5/2008 | Hamilton | ............ | F16L 33/24 138/135 |

(Continued)

*Primary Examiner* — David Bochna
(74) *Attorney, Agent, or Firm* — BACON & THOMAS, PLLC (57) ABSTRACT

A pigtail hose is described for connecting a gas canister to a gas regulator. The pigtail hose includes a gas hose having an inlet end and an outlet end; and an elbow fitting connected to the inlet end of the gas hose. The elbow fitting has a bore which turns the gas supply through 90° at a convenient point of the gas supply assembly to assist with the connection of the canister in a confined storage space.

7 Claims, 4 Drawing Sheets

(56) References Cited

U.S. PATENT DOCUMENTS

2022/0120213 A1\* 4/2022 Ong .................... F02D 19/066

\* cited by examiner

PIGTAIL HOSE WITH ELBOW FITTING

FIELD OF THE INVENTION

The present invention relates to a pigtail hose for connecting a gas canister to a gas regulator, in particular a pigtail hose comprising a gas hose and an elbow fitting. The present invention also relates to a gas supply assembly incorporating said pigtail hose, and a method of connecting a gas canister to a gas regulator using a pigtail hose.

BACKGROUND OF THE INVENTION

Portable gas supplies, such as gas canisters, are often used as a source of fuel when travelling, especially in boats, motorhomes, and trailers (caravans). As such, these craft, vehicles or trailers often have a dedicated storage space for such gas supplies. Within this storage space, there is typically a gas supply assembly comprising a gas canister (usually two or more gas canisters), a gas regulator, and hosing connecting the gas canister to the gas regulator and connection to one or more appliance beyond. The hose connecting the gas canister to the gas regulator is known as a "pigtail" hose.

These storage spaces are often in the form of rigid boxes, mounted on the vehicle or trailer, or in the case of boats may be in the form of storage locker, and as such they are limited in width and volume. As an example, the storage space on a trailer may be a moulded box mounted to the front of a trailer, e.g., a glass fibre reinforced plastic box or sheet metal box, which is closed off with a lockable, hinged lid. The box may be relatively close fitting to the dimensions of the gas canisters. Consequently, there is often little extra space between the walls of the storage space and the edge of the gas canister(s). It is also usual to have as compact a storage space for the gas canisters as possible, since usually space is at a premium in these environments.

While hoses are available in different lengths and sizes can be chosen to fit, typically any hoses connecting the one or more gas canisters to the gas regulator must be flexed and bent, at least to an extent, to accommodate the relative positions of gas canisters and the gas regulator, and to fit the overall length of the hose within the storage space. In order to be gas-tight and robust, however, these hoses are often relatively thick-walled and relatively stiff to manipulate, and so any bends in them will generally adopt a large radius within the space, potentially coming into contact with a wall or other part of the storage space.

Bending a hose significantly may potentially weaken the strength of the hose and/or cause wear through rubbing on contact points, leading to a risk of gas leaks.

Gas supplies can be extremely dangerous if there are leaks or other faults at any point in the gas supply system. Leaks can lead to a large build-up of gas in or around the vehicle, which poses a risk both in terms of the flammability of the gas and risk of explosion, as well as its toxicity if inhaled.

There has therefore been efforts to create safer gas supply systems in order to prevent any such leakages. This has led to the development of, for example, gas safety valves, which are added to gas supply assemblies of the type described above in order to shut off the supply of gas as soon as a leak is detected. Such gas safety valves are available through manufacturers like Gas Stop Europe BV, for example as shown in U.S. Design Pat. No. D872834, which is incorporated by reference, that work through the gas safety valve detecting a pressure drop across the gas safety valve and shutting off the gas supply, thereby preventing gas build-up downstream. The gas safety valve of U.S. D872834 can be reset by depressing the gauge towards the body against a spring bias and releasing.

However, as desirable these gas safety valves are for craft, vehicle or trailer safety, these safety additions also add to the size of the assembly, often resulting in the assembly being difficult to fit or too large to fit within the storage space of the vehicle. In view of this, it is desirable to develop a safer and more compact gas supply arrangement, which can include any desired safety features whilst still fitting within a standard and/or existing gas supply storage space of a craft, vehicle or trailer.

SUMMARY OF THE INVENTION

Viewed from a first aspect, there is provided a pigtail hose for connecting a gas canister to a gas regulator. The pigtail hose comprises a gas hose having an inlet end and an outlet end; and an elbow fitting connected to the inlet end of the gas hose.

The pigtail hose of the first aspect provides a simple and reliable connection between an outlet port of a gas canister and an inlet port of a gas regulator. That is, the pigtail hose provides an angled connection on one end of the hose between the gas canister and the gas regulator, allowing gas safety valves to be incorporated into a gas supply assembly with minimal bending of the pigtail hose. Such an arrangement is particularly advantageous for gas canisters that are used in, for example, trailers, motorhomes or boats, where gas canisters are often placed in storage spaces with limited volume.

The use of an elbow fitting on the pigtail hose provides a change in direction after a gas safety valve to allow a gas safety valve to be installed in an existing gas supply assembly or to be fitted as part of a new gas supply assembly without changes being required to the storage spaces of the craft, vehicle or trailer. With the correct choice of length of pigtail hose, the need to create significant bends in the gas hose is prevented, and so an easier to install, more compact and robust connection is provided overall.

Certain optional features of the pigtail hose will now be described in greater detail and by way of example only. The features may be combined as desired in preferred embodiments to provide additional advantages.

The elbow fitting may comprise a body, an inlet port, and an outlet port. The inlet port may comprise an inlet port axis that extends in a first direction. The outlet port may comprise an outlet port axis that extends in a second direction. The first direction may be at a non-180° angle to the second direction. For example, the first direction may be at an angle of between 45° and 135° to the second direction. More particularly, the first direction may be at an angle of between 60° and 120° to the second direction. In one embodiment, it may be at an angle of between 80° and 100° to the second direction, or may be perpendicular to the second direction (90°±5°). As such, the gas hose of the pigtail hose may also extend in a direction that is at a non-180° angle to the inlet port of the elbow fitting. In this way, the pigtail hose may provide an angled connection between a gas canister and a gas regulator.

The body of the elbow fitting may comprise a machined block of metal. In particular, the body may comprise a machined block of brass. The body may comprise two or more faces. The inlet port may be provided on a first face of the body, and the outlet port may be provided on a second face of the body. The first face may be perpendicular to the second face. The first and second faces may be planar. As such, the body may be easily manufactured from a length of metal bar. Additionally or alternatively, the body may be a cuboid or substantially cuboid block of metal.

The inlet port may be provided on a side of the body, whilst the outlet port may be provided on an end of the body. As such, the first face of the body may be considered to be the side of the body, and the second face of the body may be considered to be the end of the body. The inlet port may be connected to the outlet port by a bore extending through the body.

The bore may comprise a main bore and a side bore. The main bore and/or the side bore may be a cylindrical bore. The main bore may extend from the outlet port along the outlet port axis and may intersect with a side bore. The side bore may extend from the inlet port along the inlet port axis and may intersect with the main bore. The bore may further comprise an intersection point. The main bore may connect with the side bore at the intersection point. The bore may be configured such that gas passing through the elbow fitting enters through the inlet port, travels through the side bore, turns at the intersection point, travels through the main bore, and then exits through the outlet bore.

One or more of the inlet port and the outlet port, preferably both, may be provided with a female screw thread. An outlet end of the gas hose may be provided with a male or female threaded connector for connection to the gas regulator. An inlet end of the gas hose may be provided with a male threaded connector for attachment with the female screw thread of the outlet port.

Additionally or alternatively, the elbow fitting may be provided with a QCC-1 connector. The QCC-1 connector may be known as an ACME QCC-1 connector. The QCC-1 connector may comprise both a male screw thread and a female screw thread. The male screw thread may be a right-hand screw thread, and may be configured to connect to the inlet port of the elbow fitting by a threaded connection with the female screw thread of the inlet port. The female screw thread may be a left-hand screw thread. The inlet end of the gas hose may therefore be provided with a connector compatible with that of a QCC-1 female threaded connector. The QCC-1 connectors may act as a standardised connector for the elbow fitting. In this way, it can be ensured that the elbow fitting can be securely connected to a wide range of fittings.

The female screw threads of the elbow fitting may be provided with an adhesive during assembly. In other words, an adhesive may be applied to the screw threads of the elbow fitting. The adhesive may be configured to lock, in a gas-tight manner, any connector fittings to the elbow fitting. Additionally or alternatively, the adhesive may be configured to lock the QCC-1 connector to the elbow fitting. The adhesive may be applied to the screw threads of the QCC-1 connector. The adhesive may comprise any one of epoxy resin, acrylic adhesive, polyethylene adhesive, or the like. In this way, any connector fitted to the elbow fitting can be locked in a secure and gas-tight manner, improving the reliability and robustness of the pigtail hose overall.

The gas hose part of the pigtail hose may be of any suitable length, depending on its particular use and the components involved. For example, the gas hose may be of a length between 9 and 30 inches (between 23 cm and 76 cm). More particularly, the gas hose may be of a length between 10 and 25 inches (between 25 cm and 64 cm), or 12 and 18 inches (between 30 cm and 46 cm). The gas hose may have a length of less than 1 m. The gas hose may comprise a rubber gas hose and may have a reinforced wall. The gas hose may be a high-pressure hose and may be manufactured with one or more built-in connectors of the type described above.

The gas regulator may be for maintaining a desired pressure through a gas supply system. The gas regulator may be configured to regulate a flow of gas when it reaches a predetermined pressure, such that downstream pressures can be maintained within a predicted range. The gas regulator may be a direct-operated gas regulator or a pilot-operated gas regulator. The gas regulator may be a bulkhead gas regulator. The gas canister may be a liquefied petroleum gas (LPG) gas canister. The liquefied petroleum gas may be butane, propane, or a mixture of butane and propane.

According to a second aspect, a gas supply assembly may be provided. The gas supply assembly may comprise a gas canister, the pigtail hose of the first aspect, and a gas regulator. The pigtail hose may be connected via the elbow fitting to the gas canister. The gas regulator may be connected to the outlet end of the gas hose of the pigtail hose.

More preferably, the gas supply assembly comprises a gas safety valve positioned downstream of the gas canister and upstream of the pigtail hose.

The gas canister may be a gas cylinder. The outlet of the gas canister may extend in a radial direction which is also the first direction of the elbow fitting. The gas canister may have an outer radius that extends from the centre of the gas canister to a circumferential outer surface of the gas canister. The location of the elbow fitting of the pigtail hose, when fitted to the gas safety valve in the gas supply assembly, may be positioned at a radial distance from an axis of the gas canister that corresponds substantially to the outer radius of the gas canister (e.g., plus or minus one or two inches).

The gas supply assembly may comprise a supply line downstream of the gas regulator. The gas supply assembly may further comprise an appliance at a downstream end of the supply line. The appliance may be any one of a gas barbeque, a gas stove, a gas heater, a gas light, or an electrical generator.

As described, the gas supply assembly may comprise a gas safety valve. The gas safety valve may be connected to the outlet of the gas canister, and may be connected to the gas hose of the pigtail hose via the elbow fitting. The gas safety valve may be configured to prevent a flow of gas passing from an inlet bore of the gas safety valve to an outlet bore of the gas safety valve when a pressure difference between the inlet bore and the outlet bore exceeds an allowable level. The allowable level may be a predetermined level according to the specifications of the particular assembly. In this way, the gas safety valve may automatically stop the flow of gas if there is a leak or other fault within the gas supply assembly.

The gas safety valve may comprise a stem and a pressure gauge. The pressure gauge may be mounted to a distal end of the stem and may display a gas pressure. The gas pressure may be representative of the pressure of the gas passing through the gas safety valve. In this way, the gas safety valve can provide information regarding the pressure of the gas supply from the gas canister, and can alert users to any issues or potential leaks. The gas safety valve may be configured such that it can be reset after a pressure difference between the inlet bore and the outlet bore has exceeded the allowable level. The gas safety valve may be configured such that it is reset when the stem is depressed. In this way, it may be simple to have the gas safety valve resume its normal function after the leak or fault has been fixed.

The upstream portion of the pigtail hose may be sized such that the combined length of the gas canister outlet, the gas safety valve, and the elbow fitting plus connector in a first direction is less than the gas canister outer radius. Additionally or alternatively, the combined length of the gas canister outlet, the gas safety valve, and the elbow fitting in a first direction radial to the axis of the gas canister may be approximately equal to the gas canister outer radius. This combined length may be within 1 inch of the gas canister outer radius, for example. In other words, the elbow fitting in combination with the gas safety valve may be sized such that it positions the inlet end of the gas hose approximately radially level with a circumferential outer surface of the gas canister. The gas hose may therefore extend in an approximately tangential direction from the circumferential outer surface of the gas canister towards the gas regulator. In this way, it can be ensured that the fittings between the gas cylinder and the gas regulator do not add significantly to the dimensions of the overall gas supply assembly, and specifically do not cause the dimension of the gas supply assembly in the first direction to extend significantly past the outer radius of the gas canister. Hence, it can be ensured that the gas supply assembly will fit in any storage space that was used for the gas canister. The pigtail hose of the first aspect can therefore be used to allow replacement gas canisters to be connected up to the gas supply assembly easily.

The pigtail hose may, of course, be used in the gas supply assembly without a gas safety valve being present. Through the presence of the elbow fitting, the pigtail hose will offer benefits in terms of allowing components of the gas supply assembly to be connected and disconnected with ease in a confined space, e.g., when changing a gas canister.

According to a third aspect, a method of connecting a gas canister to a gas regulator with a pigtail hose is provided. The pigtail hose may comprise a gas hose having an inlet end and an outlet end and an elbow fitting connected to the inlet end of the gas hose. The method may comprise the steps of attaching the pigtail hose to the gas regulator by screwing an outlet end of the gas hose into a port of the gas regulator (or connecting it in some other way, e.g., with a bayonet connection), and attaching the pigtail hose to the gas canister by screwing a connector provided on the elbow fitting onto a connector of the gas canister (or connecting it in some other way).

The pigtail hose of the method of the third aspect may include any of the other features discussed above.

The elbow fitting may guide the gas hose of the pigtail hose in a direction which is substantially perpendicular to a gas-flow direction through an outlet of the gas cylinder. The gas canister may be connected to the pigtail hose through a gas safety valve. The outlet of the gas cylinder may be connected to the inlet of the gas safety valve. The gas safety valve may extend in the same direction as that of the gas cylinder outlet, and may extend in a direction perpendicular to the outlet port axis of the elbow fitting. The method may comprise screwing an inlet port of the elbow fitting to a connector of the gas safety valve. The elbow fitting may guide the gas hose of the pigtail hose in a direction which is substantially perpendicular to a gas-flow direction through the gas safety valve.

BRIEF DESCRIPTION OF THE DRAWINGS

Certain embodiments of the disclosure will now be described in greater detail by way of example only and with reference to the accompanying drawings, in which.

DETAILED DESCRIPTION OF THE INVENTION

Figure 1:
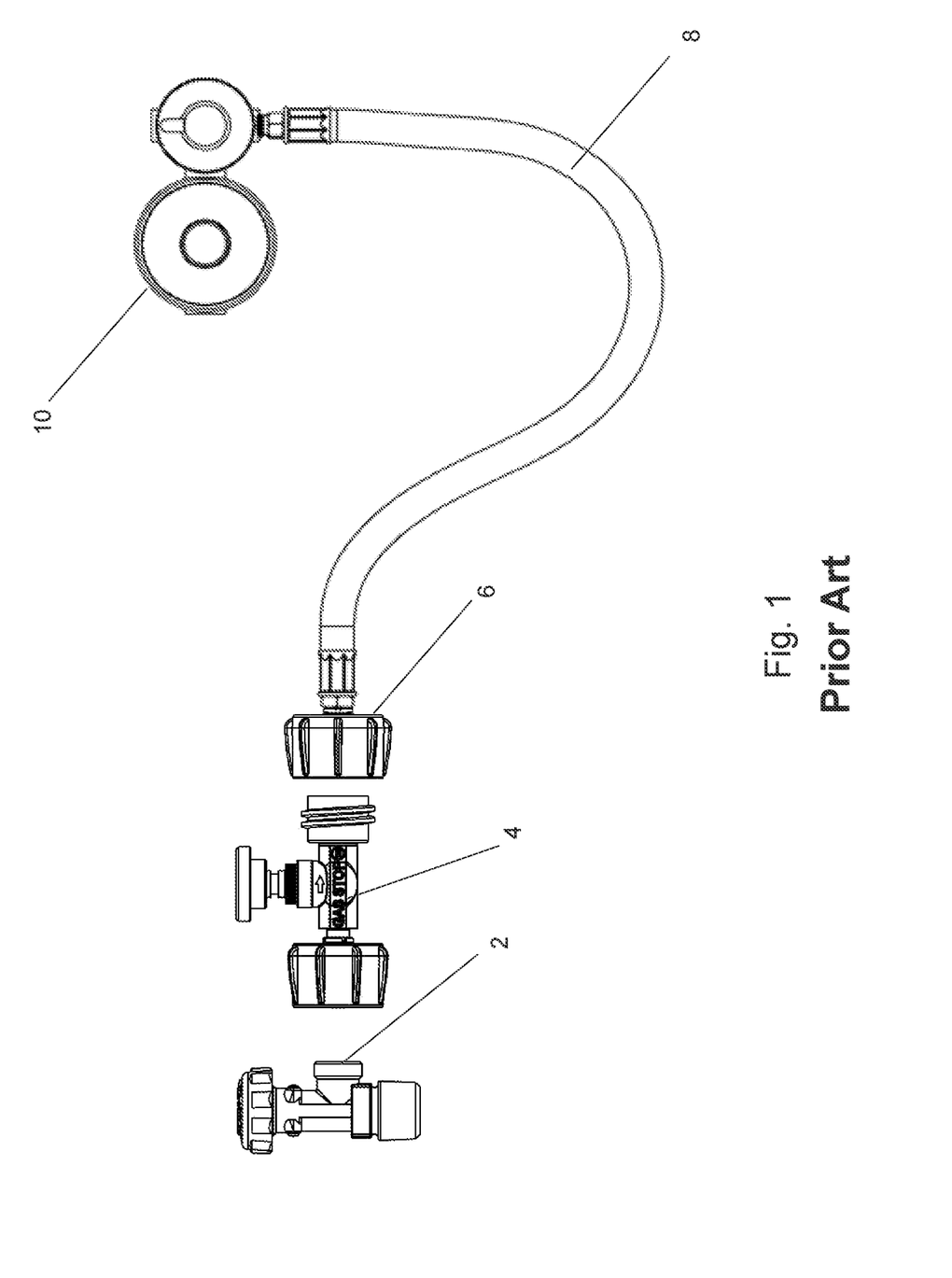
FIG. 1 shows an exploded view of a gas supply assembly of the prior art.

FIG. 1 shows a gas supply assembly according to the prior art, which may be used to supply gas to appliances in a vehicle, such as a trailer, a motorhome or a boat. The gas supply assembly comprises one or more gas canisters (not shown in this figure) with a gas canister outlet 2, a gas safety valve 4 (optional), a QCC-1 connector 6, a hose 8 and a gas regulator 10, which may then be connected to a vehicle port or a gas supply manifold (not shown).

The QCC-1 connector 6 and the hose 8 together provide a "pigtail hose" for the gas supply assembly.

Thus the gas canister is connected to the gas regulator 10 via the gas safety valve 4 and the pigtail hose (comprising the QCC-1 connector 6 and the hose 8). The gas canister represents an upstream end of the gas supply and the gas regulator 10 represents a downstream end and any references herein to "upstream" or "downstream" are with respect to the direction of gas flow between these components.

The gas supply assembly is usually located within a confined enclosure or storage locker, such as a metal box or moulded plastics storage box, which is typically a rigid box with a hinged lid. The storage locker may be sized to be a relatively close fit around the gas supply assembly. With the introduction of gas safety shut-off valves in such gas supply assemblies, it may become difficult to manipulate the components to connect them up with the gas safety valve in place due to the space constraints. As a result the user may decide to omit the gas safety shut-off valve for ease of convenience in connecting up the assembly. More seriously, the constraints of the storage space may cause wear to occur to the gas hose 8, e.g., through contact rubbing with the wall of the storage space, leading to the potential for gas leaks, or it may result in couplings not being connected properly as a result of the limited space in which to manoeuvre the components.

Figure 2:
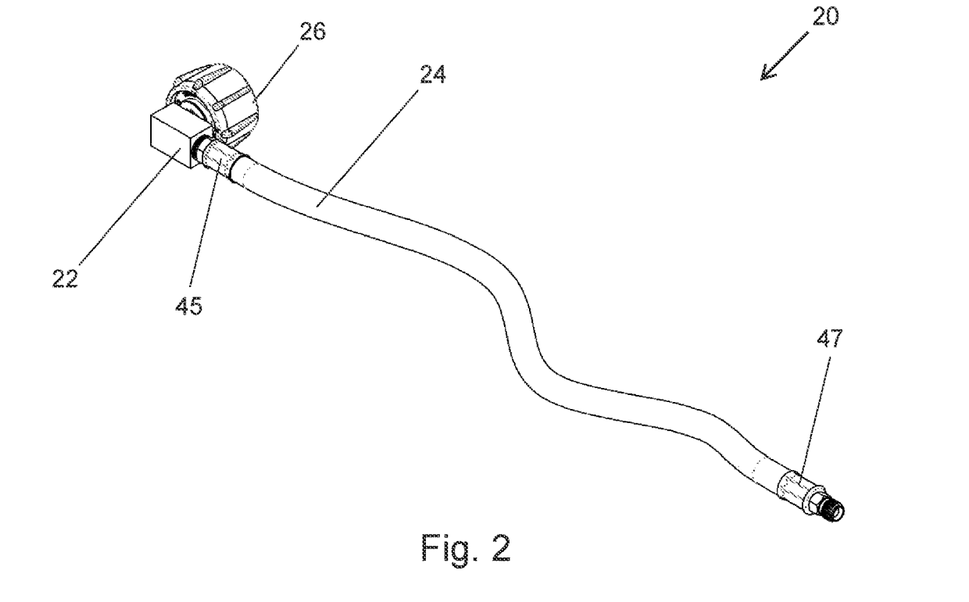
FIG. 2 shows a perspective view of a pigtail hose comprising an elbow fitting and gas hose.

FIG. 2 is a perspective view of an embodiment of a pigtail hose 20 of the present disclosure. The pigtail hose 20 is configured to connect a gas canister to a gas regulator (not shown in FIG. 2), and comprises an elbow fitting 22 and a gas hose 24. The gas hose 24 may be a high-pressure hose and/or may be a rubber gas hose. The gas hose 24 may be relatively short, and may be, for example, between 9 and 30 inches (23 and 76 cm) long, more particularly between 10 and 25 inches (25 and 64 cm) long, and more particularly of around 12 or 18 inches (30 or 46 cm) long. The pigtail hose 20 may further comprise a QCC-1 connector 26, e.g., as shown, for connecting an inlet of the pigtail hose 20 to an outlet of a gas canister. The QCC-1 connector 26 may be supplied pre-secured in a gas-tight manner to the remainder of the pigtail hose 20, e.g., using an adhesive to lock the connection between the sub-parts of the pigtail hose 20.

As can be seen from FIG. 2, the pigtail hose 20 provides an angled connection between the gas canister and the gas regulator, in this case a 90° connection. An angled connection has been found to be helpful to accommodate the components of the gas supply assembly more easily within the constraints of storage spaces when a gas safety shut-off valve is used. The pigtail hose 20 shown in FIG. 2 provides such an angled connection through the elbow fitting 22.

Figure 3:
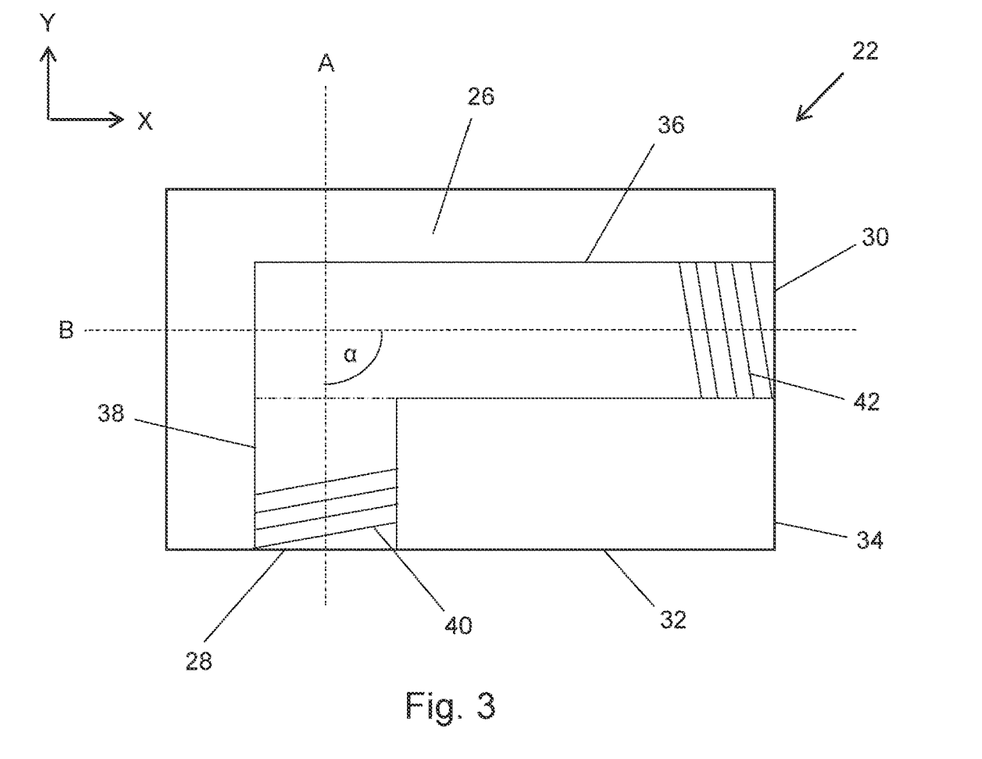
FIG. 3 shows a cross-section of the elbow fitting of FIG. 2.

FIG. 3 shows a cross-section through the elbow fitting 22 of FIG. 2. The elbow fitting may comprise a body 26, an inlet port 28 and an outlet port 30. The body 26 may be a machined block of brass, though it will be appreciated that the body 26 may comprise any suitable metal or gas-tight, machinable material. The elbow fitting 22 may comprise a first face 32 and a second face 34. The first face 32 may be considered to be a first side of the elbow fitting 22, and the second face 34 may be considered to be a second side or an end of the elbow fitting 22. In a rectangular, cuboid block of material as shown, the inlet port 28 may be provided in one side 32 and the outlet port 30 may be provided in the end 34. The first face 32 and/or the second face 34 may be planar, such that other fittings can be tightly attached to the ports 28, 30. As an example, in the elbow fitting 22 shown in FIG. 3, the body 26 may comprise a cuboid block of brass that has been machined to provide the inlet and outlet ports 28, 30.

The inlet port 28 may be connected to a gas cylinder and the outlet port 30 may be connected to the gas hose 24. The inlet port 28 may comprise an inlet port axis A extending in a first direction Y and the outlet port 30 may comprise an outlet port axis B extending in a second direction X. The inlet port axis A may be at a non-180° angle α to outlet port axis B. Angle α may be between 45° and 135°, more particularly between 60° and 120°, and more particularly between 80° and 100°. The inlet port axis A may be perpendicular to the outlet port axis B, such that angle α may be 90°.

The body 26 may be provided with a main bore 36 and a side bore 38. The main bore 36 and the side bore 38 may extend through the body and may be substantially cylindrical in shape. The main bore 36 may be aligned with the outlet port 30 and the outlet port axis B, and the side bore 38 may be aligned with the inlet port 28 and the inlet port axis A. As such, the main bore 36 may intersect the side bore 38 at the angle α at an intersection point of the two axes. Gas passing through the elbow fitting 22 may, in sequence, pass through the inlet port 28, the side bore 38, the main bore 36 and the outlet port 30.

Figure 4:
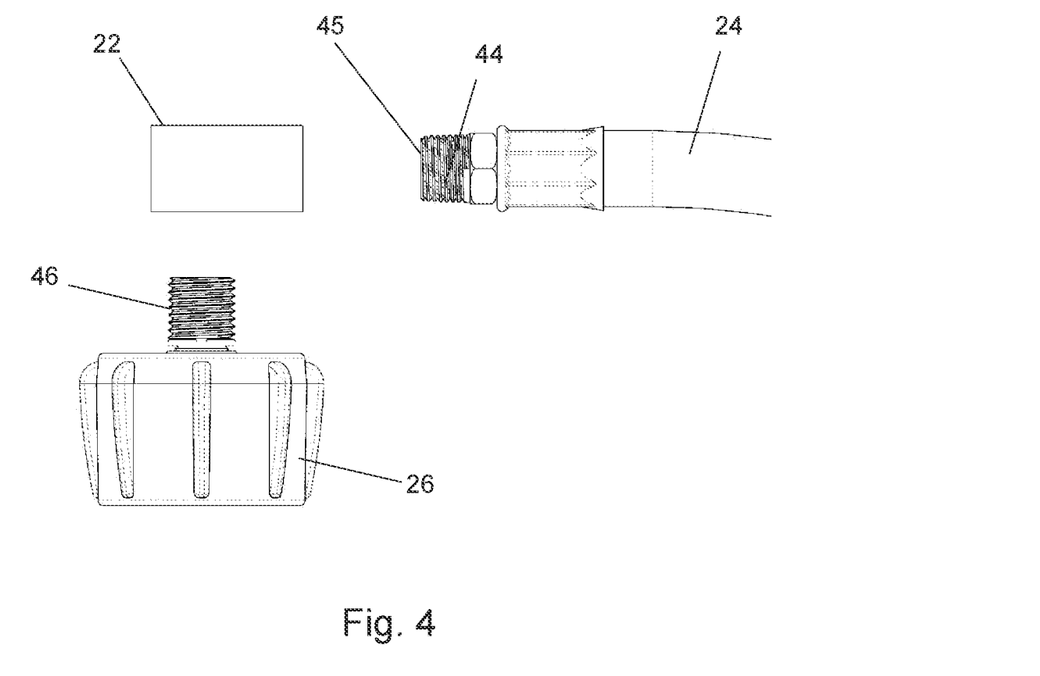
FIG. 4 shows an exploded view of the pigtail hose of FIG. 2.
Figure 5:
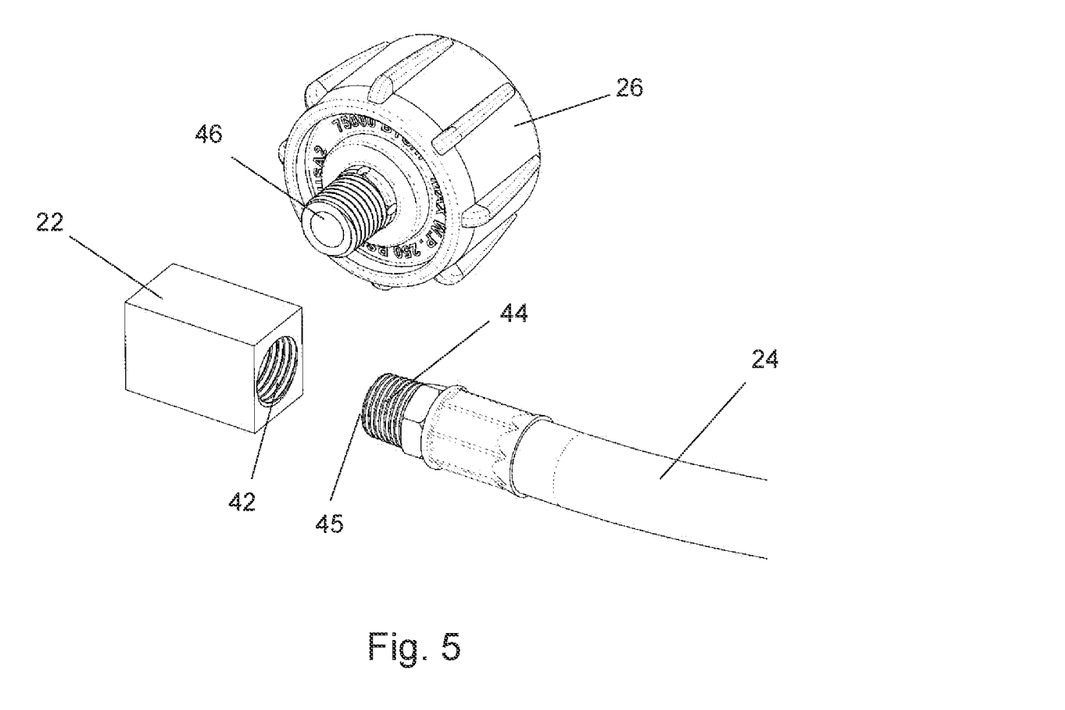
FIG. 5 shows an alternative exploded view of the pigtail hose of FIG. 2.

The inlet port 28 may comprise a female screw thread 40, and/or the outlet port 30 may comprise a female screw thread 42. The female screw threads 40, 42 may be left-handed screw threads. Hence, the elbow fitting 22 may connect to the gas hose 24 and the gas cylinder via male threaded connectors, which may be right-handed screw threads. For example, and as shown in FIGS. 4 and 5, gas hose 24 may comprise a male threaded connector 44 at an inlet end 45, which may be configured to connect to the female screw thread 42 of the elbow fitting 22 (see FIG. 5), and may comprise a male or female threaded connector for connection to the gas regulator at the outlet end 47. The connectors 44 of the gas hose 24 may be built-in connectors.

An outlet of a gas canister may have a male threaded connector for connection with the female screw thread 40 of the elbow fitting 22. Additionally or alternatively, the pigtail hose 20 may comprise at least one QCC-1 connector 26, which may be considered to be an ACME QCC-1 connector, and the at least one QCC-1 connector 26 may comprise a male threaded connector 46 for connection with either or both of the female screw thread 40 and the female screw thread 42 of the elbow fitting 22. As shown in FIGS. 4 and 5, the QCC-1 connector 26 may comprise a male threaded connector 46 configured to connect to the female screw thread 40 of the inlet port 28. The female screw threads 40, 42 may be provided with an adhesive, which may comprise any one of epoxy resin, acrylic adhesive, polyethylene adhesive or similar gas-tight adhesive. The adhesive may additionally or alternatively be provided on the male threaded connector 46 of the QCC-1 connector 26 and/or the male threaded connector 44 of the gas hose 24. The adhesive may securely lock any fittings external to the elbow fitting 22 to the elbow fitting 22, e.g., through locking the screw threads and preventing accidental unscrewing of the components.

Figure 6:
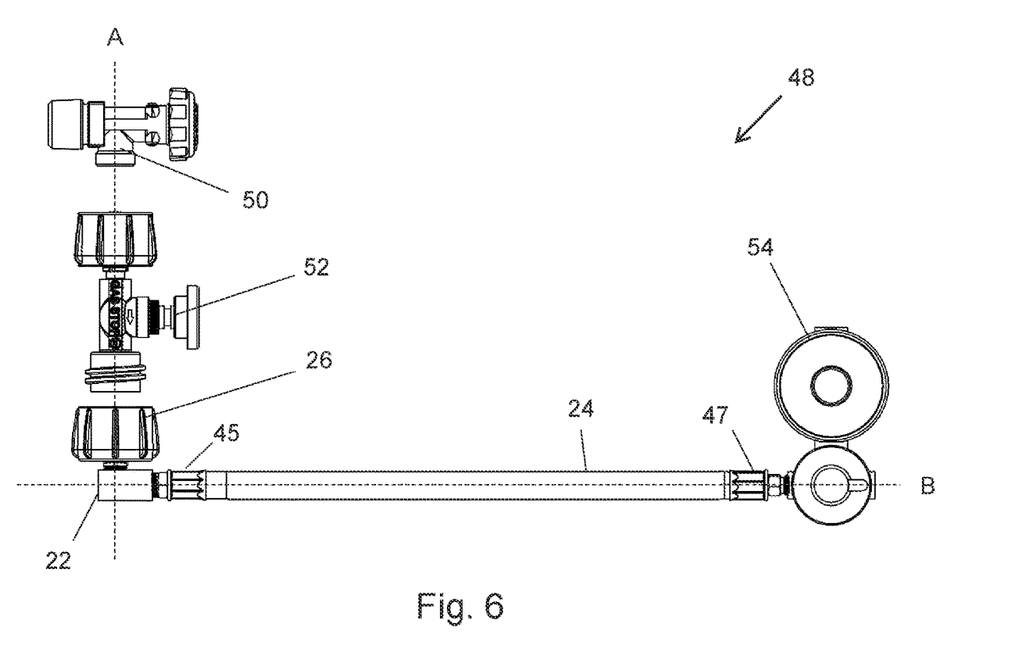
FIG. 6 shows a gas supply assembly comprising the pigtail hose of FIG. 2.

FIG. 6 shows a gas supply assembly 48 comprising the pigtail hose 20 of FIG. 2.

The gas supply assembly 48 may comprise a gas canister outlet 50, a gas safety valve 52, the pigtail hose 20 and a gas regulator 54. In FIG. 6, the pigtail hose 20 comprises a QCC-1 connector 26, an elbow fitting 22 and a gas hose 24. In FIG. 6, the pigtail hose 20, the gas safety valve 52 and the gas canister outlet 50 are not connected, but it will be understood that these components will be connected to one another during operation.

The gas safety valve 52 may be configured to stop a flow of gas passing through the valve when a pressure difference between an outlet and an inlet of the gas safety valve 52 exceeds a threshold. The gas safety valve 52 may comprise a pressure gauge for displaying the pressure difference between the outlet and the inlet of the gas safety valve 52. The gas safety valve 52 therefore may act to detect and shut-off downstream gas leakages, thereby preventing gas build-up.

The gas regulator 54 may be a bulkhead gas regulator, and may be, by way of example, direct-operated or pilot-operated.

As can be seen in FIG. 6, the inlet port 28 of the elbow fitting 22 may connect to an outlet of the gas safety valve 52 and an inlet of the gas safety valve 52 may connect to the gas canister outlet 50. On the other side, the outlet port 30 of the elbow fitting 22 may connect to an inlet end 45 of the gas hose 24 and an outlet end 47 of the gas hose 24 may connect to an inlet of the gas regulator 54.

As shown in FIG. 6, the gas safety valve 52 may extend radially outward from the gas canister outlet 50. The provision of a gas safety valve 52 in the gas supply assembly displaces the location of the coupling to the pigtail hose 20 by the axial length of the gas safety valve. With the pigtail hose of the present disclosure, where the gas safety valve couples to the elbow fitting 22 of the pigtail hose 20, the gas supply assembly changes direction by around 90°. This allows the input end of the gas hose 24 to extend tangentially to the cylindrical wall of the gas canister rather than radially. It also allows the gas hose 24 to bend gently, where necessary, within the confines of the storage space to follow the curvature of the gas canister. In this way, the components of the gas supply assembly can be connected up more easily in the space available and undesirable contact or wear with surfaces of the storage space can be avoided.

Although not shown in FIG. 6, the gas supply assembly would usually connect to a supply line downstream of the gas regulator, with connection to an appliance, such as a gas barbeque, a gas stove, a gas heater, a gas light or an electrical generator.

Figure 7:
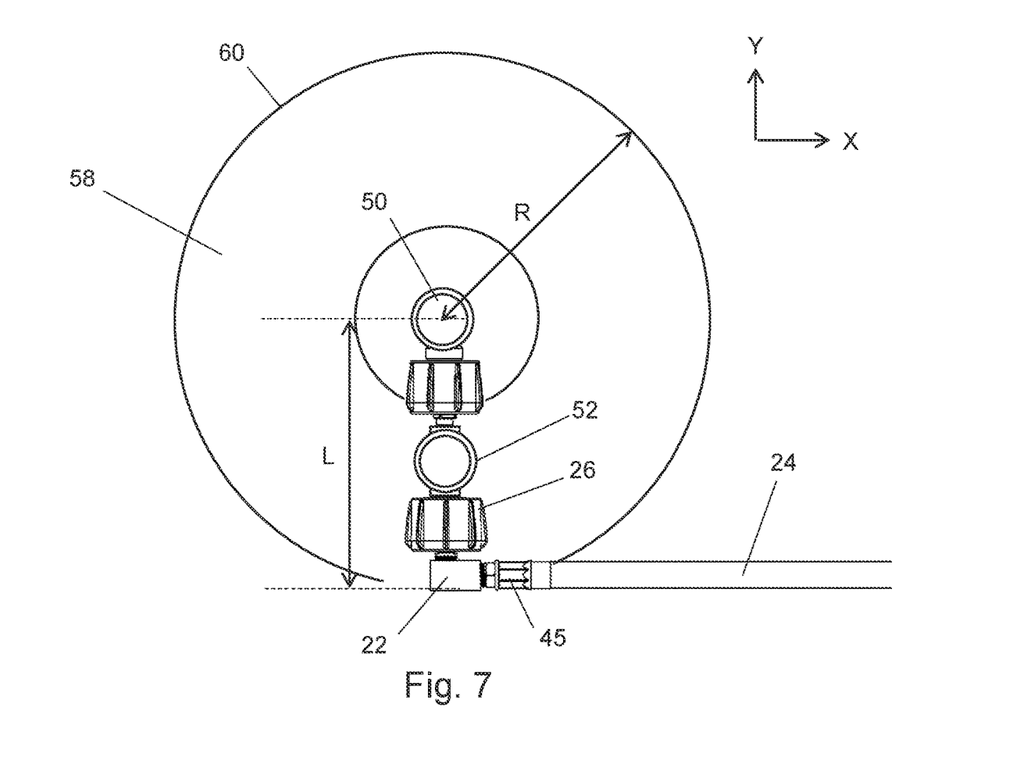
FIG. 7 shows another perspective of the gas supply assembly of FIG. 6, with the gas canister shown.

FIG. 7 shows a section of the gas supply assembly 28 when all of the components are connected together. FIG. 7 also shows a gas canister 58, which releases gas through gas canister outlet 50. This gas canister 58 may contain liquefied petroleum gas (LPG), such as butane and/or propane. The gas canister 58 may have a generally cylindrical shape, with an outer radius R, as shown in FIG. 7, which extends from the axial centre of the gas cylinder 58 to a circumferential outer surface 60 of the gas cylinder 58. The gas cylinder outlet 50, the gas safety valve 52, and the elbow fitting 22 (including the QCC-1 connector 26 in FIG. 7) may have a combined length L along the inlet port axis A when assembled in the gas supply assembly 28. In other words, the combined length L may be the combined length of the gas cylinder outlet 50, the gas safety valve 52, and the elbow fitting 22 in the first direction Y when assembled together. The combined length L may be approximately equal to the outer radius R, for example within 1 or 2 inches of the outer radius R. Additionally or alternatively, the combined length L may be less than the outer radius R, in order to stay within the footprint of the gas canister 58.

In such arrangements, the outlet port 30 of the elbow fitting 22, and consequently the upstream end of the gas hose 24, may extend in a direction that is approximately tangential to the circumferential outer surface 60 of the gas cylinder 58. That is, the inlet end 45 of the gas hose 24 may be approximately radially level with the circumferential outer surface 60 of the gas cylinder 58. In this way, it may be ensured that the gas supply assembly 48 is as compact as possible, and does not extend in the first direction Y any further than the outer radius R of the gas canister 58. There is also usually a void around the neck of the gas canister 58 that the gas hose 24 can then extend within, following a generally curved or helical path as necessary, without contacting the surfaces of the storage space or if touching, doing so with only a minimal contact force so as to avoid wear on the gas hose 24 (and in any event, reducing the contact force of any touching to significantly less than would be exerted if the gas hose 24 had exited the gas safety valve in a radial direction towards a surface of a storage space). The tangential extension of the gas hose 24 also helps a user to connect up and disconnect the gas supply assembly, for example when retrofitting a gas safety valve within an existing gas supply assembly and/or when replacing an empty gas canister 58 with a full one, because the gas hose 24 is not being forced against a wall or other surface of a storage space.

The pigtail hose 20 with the elbow fitting 22 is therefore configured to provide a simple and secure connection between a gas canister 58 and a gas regulator 54, which does not require the gas hose 24 to be bent significantly, and thus allows the gas supply assembly 48 to be as compact as possible through the tangential or approximately tangential take off. This is made possible through the elbow fitting 22, which provides the required bend in the supply without compromising the integrity of the gas hose 24. In this way, it can be ensured that the gas supply assembly 48 will comfortably and safely fit in the storage space of a vehicle, and thus, an improved pigtail hose is provided.

The invention claimed is:

1. A pigtail hose for connecting a gas canister to a gas regulator, the pigtail hose comprising:
   a gas hose having an inlet end and an outlet end; and
   an elbow fitting connected to the inlet end of the gas hose, wherein the elbow fitting comprises:
   a body, wherein the body of the elbow fitting comprises a machined cuboid block of metal;
   an inlet port provided in a side of the block, the inlet port comprising an inlet port axis that extends in a first direction;
   a connector provided on the side of the block connected to the inlet port for connection to a fitting from a gas canister;
   an outlet port provided in an end of the block, the outlet port comprising an outlet port axis that extends in a second direction, wherein the first direction is at an angle of between 45° and 135° to the second direction;
   a bore extending within the body, the bore consisting of a side bore extending from the inlet port along the inlet port axis and a main bore extending from the outlet port along the outlet port axis, the side bore intersecting with the main bore to form an L-shaped bore within the block for gas passing through the elbow fitting from the inlet port to the outlet port, and
   wherein the elbow fitting is provided with a QCC-1 connector.

2. The pigtail hose as claimed in claim 1, wherein the first direction is at an angle of between 80° and 100° to the second direction.

3. The pigtail hose as claimed in claim 1, wherein the QCC-1 connector comprises a male screw thread and is joined to the elbow fitting by a threaded connection with a female screw thread provided in the elbow fitting.

4. The pigtail hose as claimed in claim 1, wherein the outlet end of the gas hose is provided with a male threaded connector for connection to the gas regulator.

5. The pigtail hose as claimed in claim 1, wherein the gas hose is of a length between 9 and 30 inches.

6. The pigtail hose as claimed in claim 1, wherein the gas hose comprises a rubber gas hose having a reinforced wall.

7. The pigtail hose as claimed in claim 1, wherein the gas hose and the connector for connection to a fitting from a gas canister are locked in a gas-tight manner to the elbow fitting with an adhesive.

* * * * *